3,481,710
PRODUCTION OF NITROSYL HALIDES OF IRON, COBALT, AND NICKEL

Perry L. Maxfield, Durango, Colo., assignor to Phillips Petroleum Company, a corporation of Delaware
No Drawing. Continuation-in-part of application Ser. No. 518,018, Jan. 3, 1965. This application Dec. 30, 1966, Ser. No. 606,041
Int. Cl. C01b 21/20, 9/00; C01g 51/00
U.S. Cl. 23—356                                                     4 Claims

ABSTRACT OF THE DISCLOSURE

Nitrosyl halides of iron, cobalt, and nickel are prepared by reacting the metal dihalides, nitric oxide, and the respective elemental metal and/or zinc.

---

This application is a continuation-in-part of my co-pending application, Ser. No. 518,018, filed Jan. 3, 1965, and now abandoned, which relates to the production of nitrosyliron halides.

It is known in the art that butadiene can be thermally dimerized to 4-vinylcyclohexene. More recently, however, it has been found that this dimerization of butadiene to 4-vinylcyclohexene can be accomplished much more effectively through the use of catalyst consisting of nitrosyl halides of iron, in combination with suitable reducing agents. Similarly, compounds such as nitrosyl(triphenylphosphine)chloronickel have also been found useful in processes to dimerize olefins.

It is also known as disclosed by Walter Hieber and Reinhard Nast, "Chemical Abstracts," volume 35 (1941) column 2807–2808, that a compound of the formula Ni(NO)I can be prepared in solid phase at relatively elevated temperatures in the range of from 140–200° C. by the solid phase reaction of nickel iodide and zinc dust with nitric oxide. Such procedure is inconvenient and yields are relatively low. Product separation is also complicated by the manner in which reaction is effected.

While nitrosyl halides of iron, cobalt, and nickel are known compounds, the processes of the prior art for synthesizing these materials are very tedious and time consuming and the yield of desired compound are quite low. For example, a method of the prior art describing the synthesis of nitrosyliron iodide involves the treatment of iron carbonyl with NO to form a nitrosyliron carbonyl which is then treated with iodine to effect a replacement of the remaining carbonyl groups with iodine.

It has now been found that such nitrosyl halide compounds can be more conveniently prepared and in greater yields by carrying out the contact at much lower temperatures but in the presence of selected solvents using a technique in which the NO is added to the system which is preferably under reflux in the temperature range of from about 25 to about 125° C., preferably 50 to about 100° C.

The dimerization of butadiene to 4-vinylcyclohexene with nitrosyliron halides and suitable reducing agents proceeds to give essentially quantitative yields. As the result of this high degree of utility it is of considerable interest to provide a means for the effective and economical production of these nitrosyl halide compounds.

It is therefore one object of this invention to provide a new, efficient method for the preparation of nitrosyl halides of iron, cobalt, and nickel. It is a further object of this invention to provide a method for the production of nitrosyl halides from readily available and relatively inexpensive raw materials. It is yet another object of this invention to provide a method for producing nitrosylmetal halides complexed with selected ligands. It is yet another object of this invention to provide a method for the synthesis of nitrosylmetal halides and other complexed derivatives thereof in good yields and of sufficient purity for use as catalyst components.

As disclosed in the above-noted co-pending application, nitrosyliron halides can be prepared by reducing iron halides in the presence of elemental iron and nitric oxide. I have now found that the halides of cobalt and nickel can similarly be reacted with the corresponding metal and/or zinc in the presence of nitric oxide, and preferably in the presence of a diluent capable of dissolving at least a portion of the metal halide, to convert the same to the corresponding nitrosylmetal halide. I have also found that nitrosyliron halides can be prepared by reducing iron halides in the presence of nitric oxide and elemental zinc and suitable solvent.

In accordance with one embodiment of this invention, nitrosyl halides of iron, cobalt, and nickel, having the formulas $[Fe(NO)_2X]_x$, $[Co(NO)_2X]_x$, and $[Ni(NO)X]_x$, respectively, are prepared from the metal dihalides wherein X is either chlorine, bromine, or iodine, and $x$ is 1, 2, or 3, by the reaction of the same with the respective elemental metal and/or zinc and gaseous nitrous oxide in the presence of a diluent. In the isolated state these compounds are believed to exist as dimers or trimers.

In accordance with another embodiment of this invention, iron, cobalt, and nickel dihalides are reduced in a solvent medium therefore in the presence of the respective elemental metals and/or elemental zinc and at least one ligand-forming material having the formulas $$R_3M, \ (RO)_3M, \ \underset{\underset{\smile}{}}{S} \ R', \ \text{and} \ R-S-R$$

by contacting the dissolved reactants and elemental metals with nitric oxide.

In accordance with another embodiment of this invention, nitrosyliron halides are prepared, preferably, by a two-stage process which comprises, as a first step, the reaction of ferric halides wherein the halogen is either Cl, Br, or I, with elemental iron in the presence of an ether as a diluent to form ferrous halides of the formula $FeX_2$, and subsequently reacting as a second step, the thus-formed ferrous halide compound with additional elemental iron and gaseous NO.

According to the process of the invention, the iron triad metal dihalide, which can be dichloride, dibromide, or diiodide, is brought into intimate contact with a substantially stoichiometric equivalent of that particular iron triad metal powder or of zinc powder and a substantially stoichiometric quantity of nitric oxide. The contact is made in a solvent in which the metal dihalide is at least partially soluble.

Suitable solvents include saturated mono- and polyethers, which can be both cyclic and acyclic, having up to about 20 carbon atoms per molecule, saturated alcohols having up to about 7 carbon atoms per molecule, and aromatic hydrocarbons having up to about 8 carbon atoms per molecule. The preferred solvents are those which have boiling points in the range of from about 50 to about 100° C., or whose boiling points can be adjusted to that range by convenient manipulation of the reaction pressure. The amount of solvent is ordinarily not critical, about 5 to about 50 parts of solvent being used per part of metal dihalide, by weight.

Some examples of suitable solvents are ethyl ether
methyl ether
butyl ether
methyl ethyl ether
tetrahydrofuran
p-dioxane
diglyme (diethylene glycol dimethyl ether)

diethoxyethane
triglyme(triethylene glycol dimethyl ether)
decyl cyclopropyl ether
2-ethylhexyl dodecyl ether
methanol
ethanol
propanol
2-pentanol
ethylene glycol
3,3-dimethyl-1-pentanol
benzene
toluene
o-xylene and the like, and mixtures thereof. Ethers are presently the preferred solvents, tetrahydrofuran being particularly desirable.

The mixture of metal dihalide, elemental metal (preferably in finely divided powder form), ligand-forming compound (if used), and solvent is heated to a temperature in the range of about 25 to about 125° C. A stream of gaseous NO is then introduced into this mixture at any convenient rate which will permit control of the reaction and still permit the addition of the substantially stoichiometric amount of NO within a reasonably convenient time without losing excessively large amounts of NO which may pass through the liquid mixture without being absorbed and/or chemically reacted. The quantity of NO or metal powder can, of course, vary from the stoichiometric with loss of some effectiveness and/or economy. However, at least a slight excess of these reactants is presently preferred.

Agitation can be and is preferably maintained during the course of the reaction in order to prevent concentration gradients and effect the dispersion of the elemental metal throughout the reaction medium. This agitation can be accomplished by mechanical means or by turbulence created due to the nitric oxide injection. In this regard the nitric oxide gas fed to the reaction zone can be diluted with inert gas or vapors such as helium, nitrogen, solvent, vapor, etc. Such dilution of the nitric oxide feed is advantageous not only in increasing the degree of agitation realized, but also provides an effective means by which to control reaction rate.

The rate of nitric oxide absorption depends on numerous variables such as reactor temperature, solvent medium composition and concentration, reaction rate of the particular reactants, and reactor pressure. The nitric oxide feed rate is preferably controlled so that most, if not all, of the nitric oxide is absorbed and converted. Consequently, the termination of the reaction is evidenced by the presence of brown $NO_2$ vapors in the reactor effluent. Regardless of these several factors, however, about a stoichiometric amount of NO should be absorbed during the course of the reaction. For each mole of iron or cobalt dihalide, 4 moles of NO are required when metallic iron or cobalt is used as the reducing agent and 2 moles when metallic zinc is used. For each mole of nickel dihalide, 2 moles or 1 mole of NO is required when metallic nickel or zinc is used respectively. A slight excess of the theoretical amount of NO is frequently used to insure high conversions.

After the absorption of the desired quantity of NO, the reaction mixture can be cooled and the product isolated by conventional means. For example, it is generally convenient to remove unreacted metal powder from the reaction mixture by filtration, centrifugation, or simple decantation. Following this, the solid product can be obtained by simple evaporation of the reaction diluent. If desired, the product can be further purified by washing, crystallization, recrystallization, or other conventional purification techniques. The dinitrosyl halides of iron and cobalt are conveniently purified by sublimation. It should be pointed out, however, that for many catalytic applications the nitrosyl halide derivatives need not be completely isolated. In some cases, the crude reaction mixture can be utilized in a catalytic conversion process with no separation or purification whatsoever.

In another embodiment, the nitrosyl formation can be carried out in the presence of a substantially equimolar amount of one or more compounds having the formulas

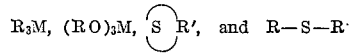

wherein R is an aromatic or saturated aliphatic radical or halo- or alkoxy-substituted aromatic or saturated aliphatic radical having up to about 20 carbon atoms; wherein R' is a divalent saturated or olefinically unsaturated hydrocarbyl radical having 3 to 7 carbon atoms; and wherein M is phosphorus, antimony, or arsenic. When such ligand-forming materials are present in the reaction zone, the products obtained are $Fe(NO)_2(L)X$, $Ni(NO)(L)X$, or $Co(NO)_2(L)X$ where (L) represents the ligand corresponding to the organic material used.

Some specific examples of suitable ligand-forming compounds are tributylphosphine
triphenylphosphine
trioctyl phosphite
tribenzylarsine
triphenyl stibonite
tricyclopentyl arsonite
tris(4-bromophenyl)phosphite
trieicosylstibine
diphenylmethylphosphine
tris(2,4,6-trimethoxybenzyl)phosphine
methyl sulfide
ethyl sulfide
methyl isobutyl sulfide
thiophene and the like, and mixtures thereof.

A particularly convenient process for the preparation of nitrosyliron halides utilizes ferric halides as starting materials. The ferric halide is first reduced with iron powder and the resulting ferrous halide is then treated as described above. However, it should be realized that this mode of disclosure is not intended in any way to limit the origin of the ferrous halides employed in the process of this invention. It is presently preferred that the ferrous halides be derived from the readily available and relatively inexpensive ferric halide. It is obvious, however, that the ferrous halides which are ultimately converted to nitrosyliron halides can be derived from any suitable source.

The conversion of the ferric halides to ferrous halides can be carried out at a temperature sufficient to sustain the reaction which temperature can be from about 25–125° C., and is preferably about 50 to about 100° C. In order to obtain a substantial degree of conversion of the ferric halides, at least a stoichiometric amount of elemental iron should be employed in this reduction step. In the presently preferred embodiment of this invention, an excess of elemental iron can be employed in this reduction stage in order to provide substantially complete conversion to the ferrous product. The stoichiometry of the system requires that one-half mole of elemental iron be employed for every mole of ferric chloride reduced. Aldure would result in less than optimum yields, and for though a lesser amount of elemental iron can be employed in this reduction stage, it is obvious that such proce- that reason at least a stoichiometric equivalent of elemental iron should be employed. Where excess iron is employed in the first reduction step it is not necessary that separation of this excess from the products be made before the subsequent reduction to the nitrosyliron halides since that reduction can also be carried out in the presence of elemental iron as above-noted. However, as described in accordance with the preparation of the nickel and cobalt derivatives, zinc can be employed to accomplish the reduction of either the ferric or ferrous halides in the first and/or second stages. Better yields can be achieved, however, by conducting the reduction of ferric to ferrous halide in the presence of only elemental iron for the reason that by this procedure additional ferrous halide is produced.

The time required for the conversion of the ferric halides to ferrous halides is usually less than one hour, although longer times can be employer if desired. Completion of the reduction of the ferric halides to the ferrous halides can be easily determined by the change in color from an orange color (ferric) to a gray color (ferrous). Thus one can proceed to the second reduction stage when the color of the reaction mixture has turned gray.

The first stage reduction is preferably carried out in the presence of a diluent of the class above described. The ethers can be saturated acyclic or saturated cyclic and can contain from 2 to about 20 carbon atoms. The ether molecule can sometimes contain other functional groups as well, but these must be inert to the environment and must not excessively reduce the solubility of the reactants or products. Typical ethers which can be used are ethyl ether
tetrahydrofuran
p-dioxane
diglyme
diethoxyethane
triglyme
methyl ether
n-butyl ether
methyl ethyl ether
n-decyl cyclopropyl ether
2-ethylhexyl n-dodocyl ether and the like. The amount of diluent present can vary over a wide range, but will usually comprise from 25–1500 lb. of diluent per pound mole of ferric halides being reduced. Non-ether diluents, such as inert hydrocarbon diluents, can be used, but reaction rates and ultimate conversions are substantially reduced under such conditions.

Following completion of the first reduction stage, the ferrous halides are contacted with additional elemental iron in at least an amount sufficient to complete reduction of the ferrous halide. Stoichiometrically, this requires one mole of elemental iron per mole of ferrous halide. If smaller amounts of iron are used, the yield of product is decreased.

In the preferred operation of the second reduction step, gaseous NO is bubbled through the reduction mixture to provide sufficient NO for conversion of the ferrous halide to nitrosyliron halide. Thus, at least six moles of NO are required per mole of the ferric iron reduced to final product when metallic iron is used in both reduction steps. This second reduction step can also be carried out in the presence of one of the diluents mentioned above, preferably the ether employed in the first reduction stage. It is also sometimes preferred to add to the second stage an additional inert diluent which is non-reactive toward the iron compounds or NO at the conditions employed. Suitable additional diluents which can be employed are: benzene, toluene, cyclohexane, n-heptane, and other similar hydrocarbons. The temperature of the second reduction stage need be only that which is sufficient to sustain the reaction therein. However, it is generally advantageous to operate the second reduction stage at a temperature of from about 25 to about 125° C., preferably 50 to 100° C.; and, in this particular embodiment, it is preferred to operate the second reduction stage at the reflux temperature at atmospheric pressure of the ether-containing diluent.

Although it is convenient and preferable to prepare the nitrosyliron halides according to the two step process described hereinabove, it is also within the scope of this invention to combine these two steps such that the ferric halide is simultaneously treated with both elemental iron and NO. Such procedure is not presently preferred, but small yields can be obtained in this manner.

It is also within the scope of this invention to prepare the nitrosyliron halide in a one step process by treatment of a ferrous halide obtained by any other suitable means such as, for example, by the treatment of excess iron with hydrochloric acid followed by crystallization of $FeCl_2$. Thus, a suitably anhydrous ferrous halide can be dispersed in the desired diluent and reduced as above described.

Although not intended to be limiting, it is believed that when an ether diluent is employed, the nitrosyliron halides produced by the process of this invention are present in the form of the complex with the ether-containing diluent when in solution. The formula of these complexes is believed to be $Fe(NO)_2X(ether)$. This complex is readily decomposed by evaporation of the ether after which the nitrosyliron halide product can be further purified by any desired means.

It has been observed that nitrosyliron halide compounds prepared by the process of this invention can be readily employed as components in the catalyst systems for the catalytic dimerization of butadiene to 4-vinylcyclohexene. The following specific examples are intended to show that nitrosyliron halides can be readily and efficiently prepared by this new process. However, these examples are intended only to be illustrative of the concept of the present invention and are not intended to define or limit the scope of this invention.

EXAMPLE 1

5.0 grams of $NiBr_2$, 12.1 grams of triphenylphosphine, and 5.0 grams of Ni powder were mixed under nitrogen with 50 ml. dry benzene and the mixture heated to reflux. A flow of gaseous NO was passed through the refluxing solution which rapidly turned a deep blue color. The refluxing and NO addition were continued for about one hour with an excess of NO as evidenced by the appearance of brown fumes at the mouth of the exhaust.

The reaction mixture was decanted to remove most of the excess nickel powder, and the solvent was removed under reduced pressure to obtain a solid, in about a 90% of theoretical yield, of nitrosyl(triphenylphosphine) bromonickel.

EXAMPLE 2

7.5 grams of $NiI_2$ and 5.0 grams of nickel powder were placed in a 200 ml. flask and brought to refluxing, with stirring, with 60 ml. tetrahydrofuran. Gaseous NO was bubbled into this refluxing solution for about 1.5 hours. The heating was stopped, the deep green solution was cooled and decanted from the excess nickel powder. The solvent was then removed under reduced pressure yielding about a 90% of theoretical quantity of $[Ni(NO)I]_x$.

EXAMPLE 3

15.6 grams of $CoI_2$ and 5.9 grams cobalt powder were mixed under nitrogen, with 150 ml. of dry tetrahydrofuran in a 500 ml. flask. The mixture was brought to reflux with stirring and NO was bubbled into the mixture for about one hour. The color turned from green to a dark yellow. After removal of the excess cobalt powder and the solvent, the yield of $[Co(NO)_2I]_x$ was obtained in about an 80% of theoretical yield.

EXAMPLE 4

In this run, 16.2 grams of $FeCl_3$, 10 grams of elemental iron and 60 ml. of tetrahydrofuran were stirred under a nitrogen atmosphere at the reflux temperature of tetrahydrofuran (65° C.) until the mixture turned gray. At this time, 70 ml. of benzene was added to the mixture and NO was bubbled through the solution for 1.5 hours at 0.25 liter per minute, after which the heat was turned off and the NO rate was reduced to 0.075 liter per minute and continued at this rate for 15 minutes.

The reaction mixture, a reddish-brown solution, was then decanted from the excess iron present after which the diluent was removed under vacuum. The solid material $[Fe(NO)_2Cl]_2$ [1], which was recovered was then sublimed, and the collected sublimate was subjected to elemental analysis.

Calculated for $Fe(NO)_2Cl$: Fe, 36.9 wt. percent; Cl, 23.4 wt. percent. Found: Fe, 36.8 wt. percent; Cl, 23.4 wt. percent.

EXAMPLE 5

Another run was carried out by essentially the same procedure described in Example 4 except that additional iron was used.

In this run, 16 grams of $FeCl_3$, 15 grams of elemental iron and 60 ml. of tetrahydrofuran were stirred at reflux for 15 minutes, during which time the color changed from orange to gray. At this time, 85 ml. of benzene was added, and gaseous NO was bubbled through the mixture for 1.5 hours at 0.25 liter/minute and for 15 minutes at 0.075 liter per minute. The resulting reddish solution, which contained the $Fe(NO)_2Cl$, was decanted from the excess iron and was then employed directly as a component of a catalyst system for the conversion of butadiene to 4-vinylcyclohexene.

The process of this invention can be readily adapted to a mode of continuous operation. For example, in the production of nitrosyliron halides, the ferric chloride reduction step can be carried out in a first stage vessel of suitable design and the effluent can be passed to a second stage wherein the ferrous chloride reduction step can be accomplished by contacting ferrous halide solution with nitric oxide, additional elemental iron, and/or zinc, and, if preferred, a ligand-forming material as above detailed. The resultant nitrosyliron halide solution can be removed as an overhead from the second stage in which case the excess elemental iron can be removed from the bottom of the second stage. As an alternative, a total effluent from the second stage can be removed in which event the nitroslyiron halide solution can be separated from the excess elemental iron by a suitable means such as decantation with subsequent evaporation of the diluent to produce the solid nitrosyliron halide product. The production of the cobalt and nickel derivatives can also be conveniently arranged to accommodate continuous operation.

---
[1] The solid material is thought to be a dimer in the pure state.

I claim:
1. A method for the production of nitrosylmetal halides, which method comprises reacting at a temperature of from about 50 to about 100° C. iron triad metal halides wherein said halide is selected from the group consisting of chloride, bromide, and iodide with at least one elemental metal selected from the group consisting of the corresponding metal and zinc, and nitric oxide in a liquid phase reaction in which the liquid is saturated ethers having from 2 to about 20 carbon atoms and aromatic hydrocarbons having up to about 8 carbon atoms per molecule and recovering the thus produced nitrosyl metal halide as a product of the process.

2. The method of claim 1 wherein said metal halide is nickel iodide, cobalt iodide, or ferric chloride ($FeCl_3$), and said liquid is tetrahydrofuran.

3. A method for the production of nitrosyl metal halide ligands, which method comprises reacting at a temperature of from about 50 to about 100° C. iron triad metal halides wherein said halide is selected from the group consisting of chloride, bromide, and iodide, with at least one elemental metal selected from the group consisting of the corresponding metal and zinc, and nitric oxide, and a ligand-forming material selected from the group consisting of $$R_3M, \ (RO)_3M, \ R-S-R, \text{ and } \underset{\diagdown\diagup}{S\ R'}$$

wherein R is selected from the group consisting of aromatic, saturated aliphatic halo- and alkoxy-substituted aromatic and saturated aliphatic radicals having up to 20 carbon atoms; wherein R' is a divalent saturated or olefinically unsaturated hydrocarbyl radical having 3 to 7 carbon atoms; and wherein M is phosphorous, antimony, or arsenic in a liquid phase reaction in which the liquid is saturated ethers having from 2 to about 20 carbon atoms and aromatic hydrocarbons having up to about 8 carbon atoms per molecule.

4. The method of claim 3 wherein said metal halide is nickel bromide, said ligand-forming material is triphenylphosphine and said liquid is benzene.

References Cited

Hieber and Marin: Z. f. an. u. All Chem. 240, 241 (1939).

OSCAR R. VERTIZ, Primary Examiner

HOKE S. MILLER, Assistant Examiner

U.S. Cl. X.R.

23—50, 87; 260—606.5